United States Patent
Ng

(10) Patent No.: US 6,782,159 B2
(45) Date of Patent: Aug. 24, 2004

(54) METHOD FOR DETERMINING OPTIMAL LOCATION AND VALUE OF DISPERSION COMPENSATION MODULES IN AN OPTICAL NETWORK

(75) Inventor: Eddie Kai Ho Ng, Ottawa (CA)

(73) Assignee: Tropic Networks Inc., Kanata (CA)

( * ) Notice: Subject to any disclaimer, the term of this patent is extended or adjusted under 35 U.S.C. 154(b) by 0 days.

(21) Appl. No.: 10/443,965

(22) Filed: May 23, 2003

(65) Prior Publication Data

US 2004/0028373 A1 Feb. 12, 2004

Related U.S. Application Data

(60) Provisional application No. 60/402,563, filed on Aug. 12, 2002.

(51) Int. Cl.[7] .................................................. G02B 6/28
(52) U.S. Cl. ............................ 385/24; 398/29; 398/81; 359/615
(58) Field of Search ............................ 398/25, 28, 29, 398/34, 79, 81, 147–150, 158–161; 359/337.5, 615, 338–339; 385/24

(56) References Cited

U.S. PATENT DOCUMENTS

| | | | |
|---|---|---|---|
| 5,559,920 A | | 9/1996 | Chraplyvy et al. |
| 6,266,170 B1 | * | 7/2001 | Fee ............................ 398/147 |
| 6,515,779 B2 | * | 2/2003 | Fee ............................ 398/147 |
| 6,724,997 B2 | * | 4/2004 | Oksanen ..................... 398/150 |
| 2003/0099014 A1 | * | 5/2003 | Egner et al. ................. 359/124 |
| 2003/0180042 A1 | * | 9/2003 | Nelles et al. ................ 398/27 |
| 2004/0028373 A1 | * | 2/2004 | Ng ............................ 385/147 |

OTHER PUBLICATIONS

Chrotowski, L., et al, "Optical Network Design of a Metro Ring", University of California at Berkeley, Dec. 17, 2001.

* cited by examiner

Primary Examiner—Akm Enayet Ullah
Assistant Examiner—Michelle R. Connelly-Cushwa
(74) Attorney, Agent, or Firm—Victoria Donnelly

(57) ABSTRACT

A method for determining optimal locations and values of dispersion compensating modules (DCMs) in an optical network is provided. The method comprises repeatedly evaluating possible combinations of DCM values and locations and adding to the combination having the lowest score until a solution of DCMs is formed that satisfies the dispersion limits of the network. This method provides an optimal solution with, for example, the lowest value of DCMs necessary to meet dispersion specifications. In one embodiment, the method for determining the optimal location and value of the DCMs uses a priority queue to store the different combinations of DCM values and locations. Modifications to the method include variations in the score function, for example to minimize the total cost of the DCMs. In another embodiment, a series of priority queues are used to improve the efficiency of the method by reducing the amount of processing required to sort the priority queues.

13 Claims, 3 Drawing Sheets

METHOD FOR DETERMINING OPTIMAL LOCATION AND VALUE OF DISPERSION COMPENSATION MODULES IN AN OPTICAL NETWORK

RELATED APPLICATIONS

This application claims priority from U.S. Provisional Patent Application Ser. No. 60/402,563 to Ng, et al, filed on Aug. 12, 2002, entitled "Method for Determining an Optimal Location and Value of Dispersion Compensation Module (DCM) in an Optical Network"; and is related to U.S. patent application Ser. No. 10/273,858 to Ng, et al, filed on Oct. 12, 2002, entitled "Method and System for Determining Location and Value of Dispersion Compensating Modules in an Optical Network".

FIELD OF THE INVENTION

The present invention relates generally to optical networks, and in particular to a method for determining optimal location and value of dispersion compensating modules (DCMs) in optical networks.

BACKGROUND OF THE INVENTION

Dynamic networks have grown in size over the past decades from local area networks (LANS) to metropolitan area networks (MANs) to wide area networks (WANs), as user demand for connectivity has increased. New design issues have arisen and continue to arise as these networks become larger and more complex, necessitating the use of components such as dispersion compensating modules (DCMs) and optical amplifiers.

Determining the location and value of DCMs in MANs is a design issue that has arisen since the growth in the size of MANs has reached the degree that dispersion compensation has become necessary in MANs. Minimizing the total number and values of DCMs in the network is the motivating factor in DCM placement methods for MANs because smaller, dynamic networks, such as MANs, are cost-sensitive.

Currently, there are existing methods for determining the location and value of DCMs in a MAN whereby DCMs are placed on a selected number of fiber spans in the network. These methods are performed manually using the intuition and experience of a designer to select the locations and values of DCMs in the networks, as is illustrated by the following document.

An optical university project by L. Chrotowski, C. Mateus, F. Mo, and L. Zhou at the University of California, Berkeley dated Dec. 17, 2001 and entitled "Optical Network Design of a Metro Ring" discloses a method for DCM design in a metro ring network involving quantifying the degree of eye closure on a signal, which is used as the factor upon which the DCM placement is dependent. The placement itself however is determined heuristically by the designers, who attempt to minimize the total number of DCMs in the network by determining placement of just enough DCMs so that the network is operating within desired conditions (in this case to a maximum value of eye closure).

However, real-world MANs are topologically complex and often take the form of rings or meshes that may include coupled lightpaths. With increasing size and complexity of MANs, the manual, heuristic methods of DCM placement become impractical and inefficient.

A systematic method for determining location and value of DCMs allows efficient placement of DCMs in a variety of network topologies, as illustrated in the following patent application. U.S. patent application Ser. No. 5,559,920 to Ng et al. filed Sep. 24, 1996 and entitled "Method and system for determining location and value of dispersion compensating modules in an optical network" discloses a DCM placement procedure that comprises evaluating possible DCM values and locations and successively adding selected combinations to the network until the dispersion limits of the network are met. The method, however, does not guarantee optimality, optimality being the ability to maximize or minimize a given variable such as total dispersion, number, or cost of DCMs in the network.

Therefore, there is a need in the industry for the development of a systematic method for determining the location and value of DCMs in an optical network that would provide an optimal solution.

SUMMARY OF THE INVENTION

Therefore there is an object of the invention to provide a method for determining the optimal location and value of DCMs in an optical network that would avoid or minimize the above-mentioned drawbacks.

According to one aspect of the invention, there is provided a method for determining the optimal location and value of one or more DCMs in an optical network, comprising the steps of:

(a) determining a lightpath topology in the network;

(b) introducing and initializing a data structure having multiple entries, each entry in the data structure being used for storing DCM locations and values in the network and a score measuring the effectiveness of dispersion compensation in the network by the stored DCMs;

(c) extracting the entry from the data structure, which has the lowest score and determining if the effective dispersion on the lightpaths in the network having the stored DCMs from the extracted entries are substantially zero, the effective dispersion being an amount of dispersion accumulated along a lightpath that exceeds the maximum positive dispersion value Pos_Disp_Limit specified for the network;

(d) if the effective dispersions on a lightpath is not substantially zero, expanding the extracted entry into multiple entries by adding available combinations of DCM location and value to the extracted entry;

(e) calculating a score for each expanded entry and discarding those entries that cause the accumulated dispersion on any lightpath to be less than the maximum negative dispersion limit Neg_Disp_Limit of the network;

(f) inserting the expanded entries into said data structure; and (g) repeating the steps (c) to (f) until the effective dispersions are substantially zero for the extracted entry in the step (c).

Advantageously, the step (d) of expanding comprises expanding the extracting entry into multiple entries by adding every available combination of DCM location and value to the extracted entry.

The step of introducing and initializing the data structure comprises introducing and initializing the data structure which is a priority queue, including maintaining the entries in an ascending order according to the score; and the step (c) of extracting the entry with the lowest score comprises extracting the first entry from the priority queue.

A method may further comprise the step of maintaining the priority queue in an ascending order according to the score, comprising sorting the priority queue, the step being performed after the step (f).

Conveniently, the step (f) may comprise inserting the expanded entries into the priority queue so that the priority queue maintains the ascending order according to the score.

Beneficially, the step of determining the lightpath topology comprises:
identifying lightpaths in the network;
assigning lightpath identification numbers to the lightpaths; and
identifying fiber spans over which the lightpaths are laid.

The step of identifying lightpaths in the network may comprise identifying all lightpaths in the network including protection lightpaths and reconfigurable lightpaths.

The step (e) of calculating the score conveniently comprises calculating the score to be equal to the sum of:
the total value of the DCMs stored in the entry; and
the remaining effective dispersion in the network divided by the number of lightpaths having remaining effective dispersion.

For example, the step (e) of calculating the score may comprise calculating the score to be equal to the sum of:
$\Sigma w_i \cdot DCM_{min}$, wherein $DCM_{min}$ is the smallest DCM value to be used in the network, and $w_i$ is the weight factor for the corresponding $DCM_i$ stored in each expanded entry; and $$g(x) \cdot \min\left(\frac{w_i \cdot DCM_{min}}{DCM_i}\right),$$

wherein $g(x)$ is the remaining effective dispersion in the network divided by the number of lightpaths having remaining effective dispersion, and $$\min\left(\frac{w_i \cdot DCM_{min}}{DCM_i}\right)$$

is the smallest value of $$\left(\frac{w_i \cdot DCM_{min}}{DCM_i}\right).$$

Advantageously, the step (c) of determining if the effective dispersions are substantially zero comprises measuring the effective dispersions in units of distance.

If required, a method may further comprise the step of determining alternative DCM locations such that the transfer of the DCM to the alternative location does not change the accumulated dispersion along any lightpath in the network.

In a method described above, the step of introducing and initializing the data structure may comprise introducing and initializing the data structure, which is a series of priority queues, the series being maintained in an ascending order according to the score of the first entry of the priority queues, and the step (c) of extracting the entry with the lowest score may comprise extracting the first entry from the first priority queue in the series of priority queues.

Conveniently, the method provides the optimal location and value of one or more dispersion compensating modules (DCMs) in an optical network, wherein the optimal location is being defined as providing one or more of the following:
an optimal total dispersion in the network;
a minimal number of DCMs in the network; and
a minimal cost of DCMs in the network.

The methods for determining the optimal location and value of DCMs in an optical network of the embodiments of the invention provide a systematic procedure that is efficient and applicable to a variety of network topologies.

BRIEF DESCRIPTION OF THE DRAWINGS

Embodiments of the invention will now be described, by way of example, with reference to the accompanying drawings in which.

DETAILED DESCRIPTION OF PREFERRED EMBODIMENTS

Figure 1:
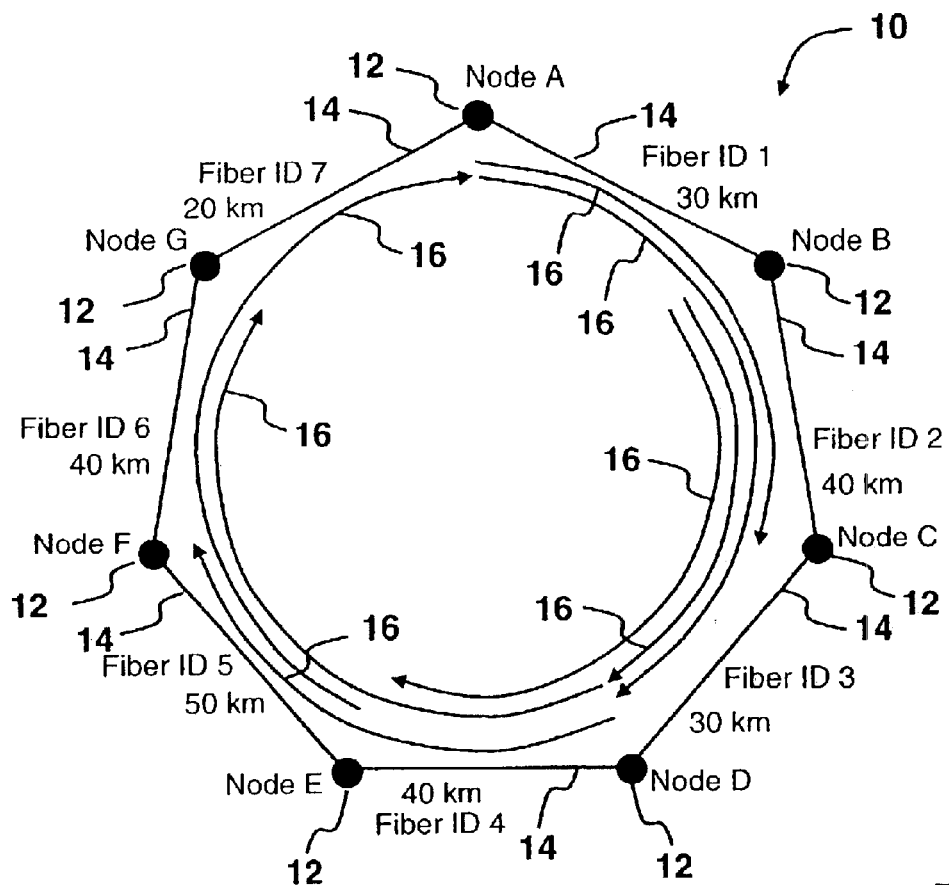
FIG. 1 is an exemplary optical network used for illustrating methods for determining the placement and value of DCMs according to embodiments of the invention.

An exemplary optical network 10 is illustrated in FIG. 1 as comprising a plurality of, in this example seven, nodes 12 identified individually as Nodes "A" through "G" (namely, nodes "A", "B", "C", "D", "E", "F", "G"), which are coupled together via fiber spans 14 identified individually by the fiber identification numbers (IDs) "1" through "7" and represented by straight solid lines. Lightpaths 16 are represented by curved solid lines with arrows indicating the direction of a network signal traveling from a source node to a destination node.

As is known in the art, such an optical network may include an arbitrary number of nodes 12 and lightpaths 16, and each of the fiber spans 14 may have different lengths and thus different dispersions. Also, such an optical network 10 may have other arrangements of nodes 12 and other lightpaths 16 through the nodes 12, such as mesh or star topologies. Accordingly, FIG. 1 serves merely to illustrate one form of optical network for the purpose of describing embodiments of the invention.

Figure 2A:
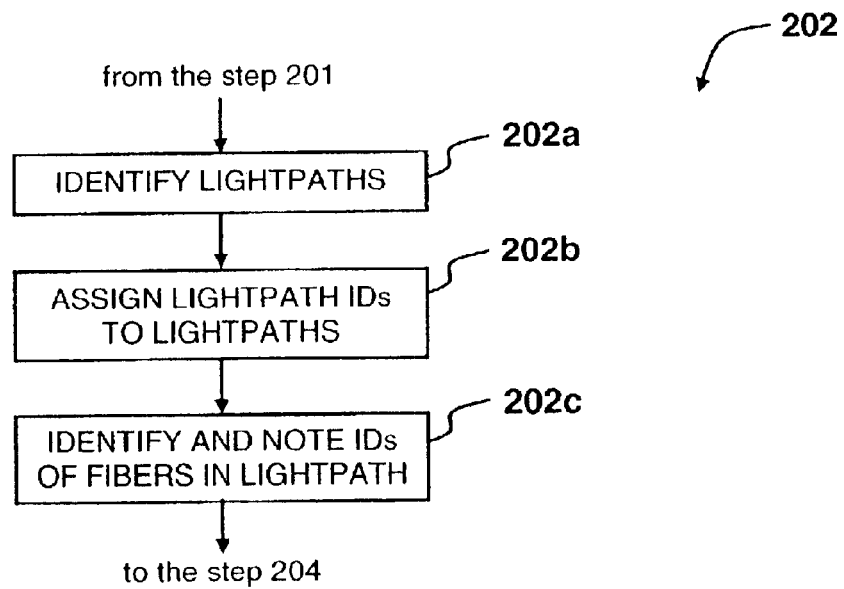
FIG. 2A is a flowchart illustrating the step 202 of determining the lightpath topology of an optical network in the method of FIG. 2 in more detail.
Figure 2:
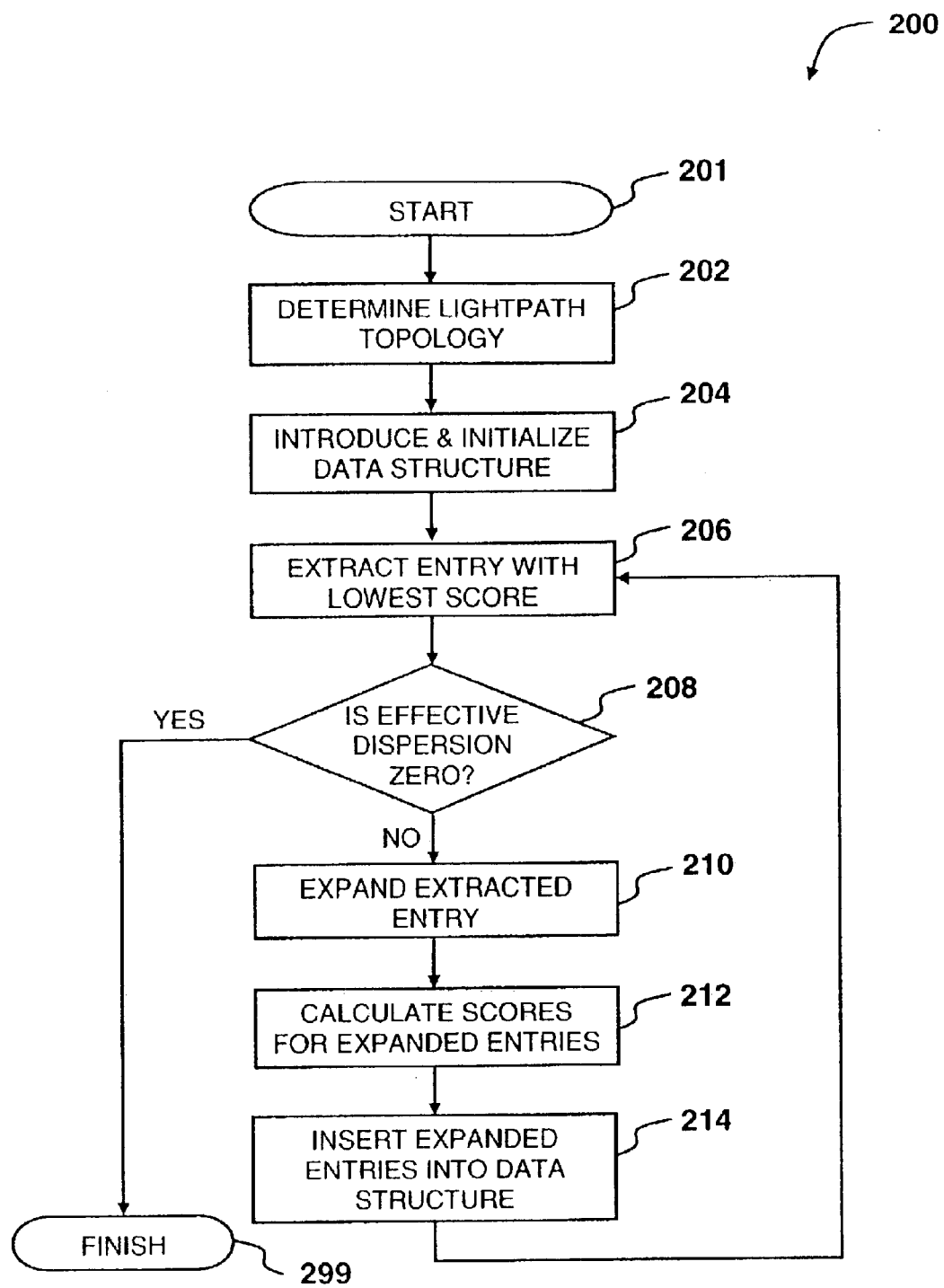
FIG. 2 is a flowchart illustrating the steps of the method for determining the optimal placement and value of DCMs according to the embodiments of the invention.

FIG. 2 is a flowchart 200 illustrating the steps of the method for determining the optimal location and value of dispersion compensating modules (DCMs) in the optical network 10 according to embodiments of the invention.

Upon start 201, the procedure 200 determines the lightpath topology of the network (step 202). Determining the lightpath topology (step 202) comprises the steps illustrated in FIG. 2A of identifying each lightpath 16 in the optical network 10 (step 202a), assigning a lightpath identification number (ID) to each lightpath 16 (step 202b), and identifying the fiber spans and noting the fiber IDs of those fiber spans over which each lightpath 16 is laid (step 202c).

After determining the lightpath topology, the flowchart 200 proceeds with introducing a data structure (step 204), each entry of the data structure storing different selections of DCM locations and values and a score. The stored DCM locations and values constitute a partial solution of DCMs for the network and the score measures the effectiveness of the stored DCMs in compensating for dispersion in the network. The data structure is initialized to, for example, a single entry with no DCMs, representing the initial network 10 without any DCMs, and a score equal to the total effective dispersion of all lightpaths in the network.

The effective dispersion on a lightpath is defined as the amount of dispersion accumulated along the lightpath that exceeds the maximum positive dispersion limit Pos_Disp_Limit of the network. The maximum positive dispersion limit Pos_Disp_Limit is derived from the specified chromatic dispersion limit of the transceivers in the network 10, as is the complementary maximum negative dispersion limit Neg_Disp_Limit. Dispersion parameters used in the method of FIG. 2, such as effective dispersion and Pos_Disp_Limit, may be specified in units of distance, as opposed to units of dispersion, if the dispersion coefficient is constant for all spans of fiber 14 in the network 10, as is the case in the exemplary network 10 of FIG. 1.

After the step 204, the procedure 200 extracts that entry in the priority queue having the lowest score (step 206) and determines if the effective dispersion along any lightpath 16 in the network 10 is substantially zero when the DCMs stored in the extracted entry are present on the network 10 (step 208).

If an effective dispersion is substantially zero with the extracted entry (exit "Yes" from the step 208), then the network 10 meets dispersion specifications with the DCMs stored in that extracted entry and the optimal DCM placement procedure 200 is finished (step 299). If the effective dispersion is positive with the extracted entry, i.e. not substantially zero (exit "No" from the step 208), then the flowchart 200 proceeds to the step 210.

In the step 210, the flowchart expands the entry extracted in the step 206 into multiple entries by adding every available combination of DCM location and value to that entry. The available DCM locations are each of the fiber spans 14 in the network 10, namely fiber spans with IDs "1" through "7". The available DCM values are those specified by design. For the exemplary network 10 of FIG. 1, the available DCM values are "40 km", "60 km", and "80 km". Thus the initial entry of the data structure with no DCMs is expanded into 21 entries, which are the 21 different combinations of DCM location and value.

The flowchart 200 then calculates a score for each of the expanded entries (step 212). In calculating the score, if the DCMs stored in the expanded entry are found to cause over-compensation of dispersion, then that expanded entry is discarded. Over-compensation of dispersion is the amount of accumulated dispersion less than the maximum negative dispersion limit Neg_Disp_Limit that results from the placement of DCMs in the network.

After calculating a score for each expanded entry, the flowchart 200 inserts the expanded entries back into the data structure (step 214) and then returns to the step 206 of extracting the entry with the lowest score.

As mentioned above, optimality is defined as the ability to maximize or minimize a given variable such as total dispersion, number, or cost of DCMs in the network. In the embodiments of this invention, the variable to be optimized is quantified by the score that is assigned to each entry in the data structure, each entry being a partial solution of DCMs for the network. Thus, the score function is defined such that the optimal solution has the lowest score of all possible solutions.

The score may be defined as the sum of two terms, one term h(x) representing the present effectiveness of the DCMs in the entry and the other term g(x) estimating the remaining required effectiveness of the DCMs. For example, if the variable to be optimized is the total value of DCMs in the solution, the score may be defined as:

$$f(x) = h(x) + g(x) = \sum DCM_i + \frac{\sum \text{eff\_disp}_i}{\text{\#\_lightpaths}}$$

where $\Sigma DCM_i$ is the total value of DCMs stored in the entry, $\Sigma \text{eff\_disp}_i$ is the total remaining effective dispersion in the network, and #_lightpaths is the number of lightpaths having remaining effective dispersion.

According to the flowchart 200 of FIG. 2, the optimal solution is the first solution that is determined by the flowchart 200. It will be proven by way of contradiction that the first solution that is determined by the flowchart 200 is always the optimal solution.

Assume that a solution S is optimal, however, another solution S' is determined first. For the solution S' to be determined first, it must have a lower score than S or any partial solution p_S of S. If the solution S' has a lower score than S, then S cannot be the optimal solution. Thus, for the solution S' to be determined first:

$$f(S') < f(p\_S)$$

In the definition of the score, the first term h(x) is the sum of the DCM values stored in the partial solution. This term increases in value in successive expansions of the entry as DCMs are added to expand the entry, thus $h(S) \geq h(p\_S)$.

The second term g(x) is the average remaining effective dispersion, which decreases with successive expansions of the entry as added DCMs decrease the effective dispersion, thus $g(S) \leq g(p\_S)$. This second term is an exact or under-estimate of the actual remaining required DCM value, as will be shown below, and thus:

$$g(p\_S) - g(S) \leq h(S) - h(p\_S)$$

which is equivalent to:

$$h(S) + g(S) \geq h(p\_S) + g(p\_S)$$

so that $$f(S) \geq f(p\_S)$$

In summary, it has been shown that for S' to be determined as the first solution:

$$f(S') < f(p\_S) \leq f(S)$$

However, as mentioned above, a solution that is optimal has the lowest score of all possible solutions. Thus, if $f(S') \leq f(S)$ then S cannot be the optimal solution, or conversely, the solution S' cannot be determined before the optimal solution S.

It will now be shown that the second term $$g(x) = \frac{\sum \text{eff\_disp}_i}{\text{\#\_lightpaths}}$$

is an exact or under-estimate of the actual remaining required DCM value. When lightpaths are not coupled, the required DCM value is the total effective dispersion over all lightpaths, so the second term g(x) being an average of the effective dispersions is an under-estimate. When the lightpaths are coupled, the required DCM value is at least the largest effective dispersion on one lightpath in order to eliminate effective dispersion on that lightpath, and again the average is an underestimate.

The only conditions that the second term must satisfy are that it be an estimate of the remaining required DCM value and that it be an exact or under-estimate of the actual remaining required DCM value. Thus, the second term g(x) may also be, for example, the maximum effective dispersion on any one lightpath 14 in the network 10.

Figure 3:
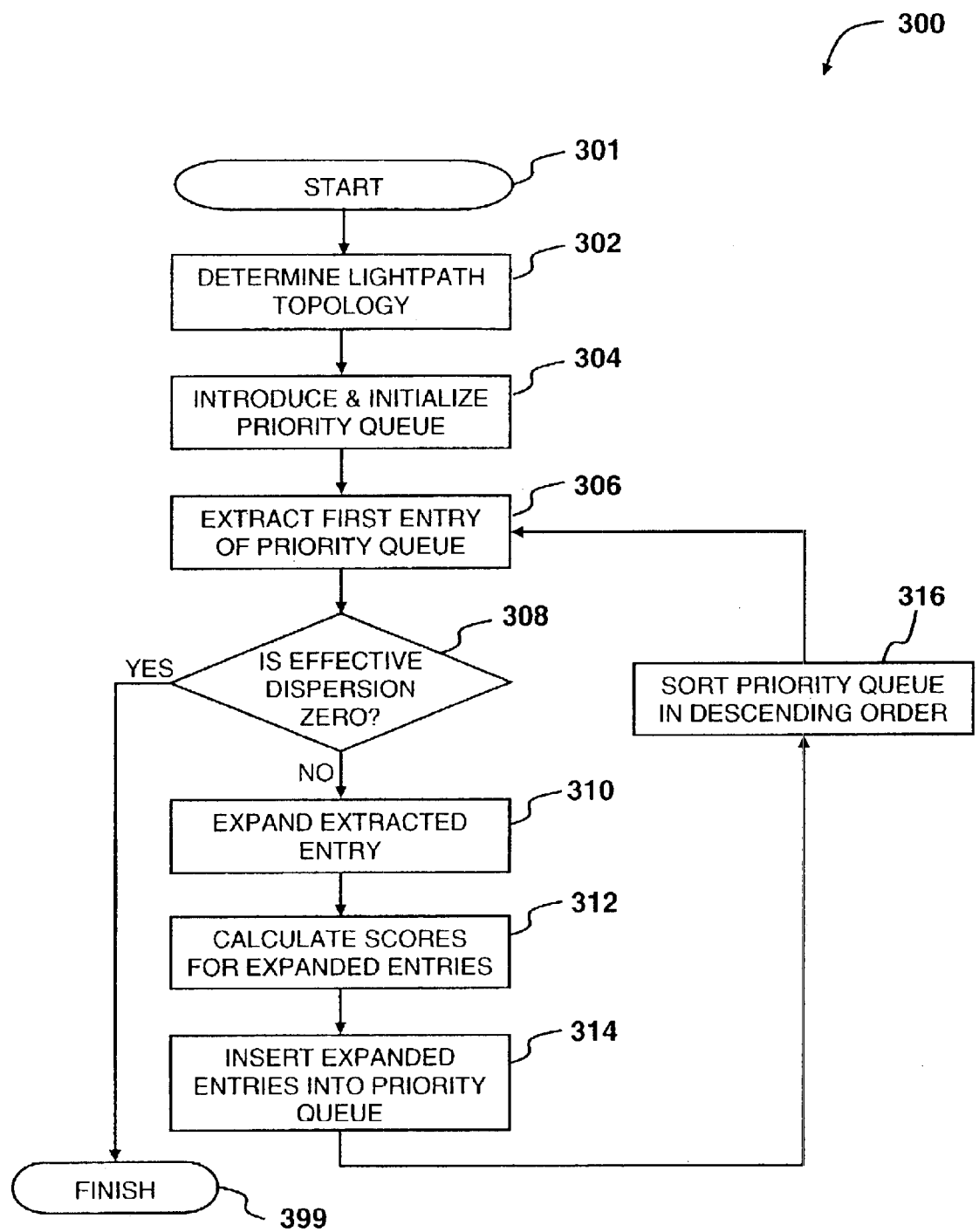
FIG. 3 is a flowchart illustrating the steps of the method for determining the optimal placement and value of DCMs according to the first embodiment of the invention.

A method of determining the optimal value and location of DCMs in an optical network-according to a first embodiment of the invention is illustrated in FIG. 3. In the first embodiment, the data structure of FIG. 2 is a priority queue that is maintained in ascending order according to score, and the step 206 of extracting the entry with the lowest score comprises simply extracting the first entry in the priority queue (step 306). An additional step 316 is performed after the step 314 and comprises sorting the priority queue in ascending order according to score.

Thus, a method for determining the value and location of DCMs in an optical network is provided that is systematic, may be applicable to a variety of network topologies, and provides an optimal solution.

This method may be applied to protected networks having additional fiber spans forming protection lightpaths between nodes, and to reconfigurable networks having multiple reconfigurable lightpaths between nodes. In the step 202a of identifying all lightpaths in the network, the protection lightpaths and the reconfigurable lightpaths are identified along with the working lightpaths. Thus, the method ensures that all lightpaths, including the protected lightpaths and reconfigurable lightpaths, meet dispersion specifications.

In a modification to the method of the first embodiment, the step 316 of sorting the priority queue is absent/removed, and the step 314 of inserting the expanded entries into the priority queue is modified to comprise inserting the expanded entries so that the priority queue maintains the ascending order according to score Thus, a method for determining the value and location of DCMs in an optical network is provided that does not require repeated sorting of the priority queue.

In another modification to the method of the first embodiment, the definition of the score includes weight factors applied to each DCM value to facilitate optimization of, for example, total monetary cost, insertion loss, or number of DCM cards. The weight factor is defined as the ratio of that characteristic that is being optimized for each of the DCMs relative to the DCM with the smallest value available. For example, if the variable to be optimized is the total monetary cost of the DCMs, and DCMs with values "40 km", "60 km", and "80 km" have costs "$4000", "$5600", and "$7200", then the ratios of the cost of the DCMs are determined to be "1.0", "1.4", and "1.8" respectively and are used as the weight factors.

The definition of the score including the weight factors may be defined as, for example:

$$f'(x) = h'(x) + g'(x) = \sum w_i \cdot DCM_{min} + g(x) \cdot \min\left(\frac{w_i \cdot DCM_{min}}{DCM_i}\right)$$

where $DCM_{min}$ is the smallest value of DCM available, and $w_i$ is the weight factor of each DCM stored in the entry.

Thus, a method for determining the value and location of DCMs in an optical network is provided that optimizes variables such as total cost, insertion loss, or number of DCMs cards in the network.

In yet another modification to the method of the fist embodiment, alternative fiber spans for the DCM location are determined such that the transfer of the DCM to the alternative fiber span does not change the accumulated dispersion of any lightpath 16 in the network 10. This step is performed upon exit "Yes" from the step 308 of determining if the effective dispersion is positive and is performed, e.g., according to the method detailed in U.S. patent application Ser. No. 10/273,858 to Ng et al. filed Oct. 21, 2002 and entitled "Method and System for Determining Location and Value of Dispersion Compensating Modules in an Optical Network".

Thus, a method for determining the value and location of DCMs in an optical network is provided that is more flexible by determining alternative locations of DCMs.

According to a second embodiment of the invention, the data structure of FIG. 2 is a series of priority queues, the series being maintained in ascending order according to the score of the first entry of each priority queue. Each priority queue is formed in the step 214 when the expanded entries are inserted as a new priority queue, which is sorted in ascending order according to score, into the data structure. Thus, the step 206 of extracting the entry with the lowest score comprises extracting the first entry from the first priority queue of the series of priority queues.

Thus, an efficient method for determining the optimal value and location of DCMs in an optical network is provided.

It is apparent to those skilled in the art that there are many variations of the present invention that retain the spirit of the invention. Thus it is intended that the present invention cover the modifications, variations, and adaptations of this invention provided they fall within the scope of the following claims.

What is claimed is:

1. A method for determining the optimal location and value of one or more dispersion compensating modules (DCMs) in an optical network, comprising the steps of:

(a) determining a lightpath topology in the network;

(b) introducing and initializing a data structure having multiple entries, each entry in the data structure being used for storing DCM locations and values in the network and a score measuring the effectiveness of dispersion compensation in the network by the stored DCMs;

(c) extracting the entry from the data structure, which has the lowest score and determining if the effective dispersion on the lightpaths in the network having the stored DCMs from the extracted entries are substantially zero, the effective dispersion being an amount of dispersion accumulated along a lightpath that exceeds the maximum positive dispersion value Pos_Disp_Limit specified for the network;

(d) if the effective dispersions on a lightpath is not substantially zero, expanding the extracted entry into multiple entries by adding available combinations of DCM location and value to the extracted entry;

(e) calculating a score for each expanded entry and discarding those entries that cause the accumulated dispersion on any lightpath to be less than the maximum negative dispersion limit Neg_Disp_Limit of the network;

(f) inserting the expanded entries into said data structure; and (g) repeating the steps (c) to (f) until the effective dispersions are substantially zero for the extracted entry in the step (c).

2. A method as described in claim 1, wherein the step of introducing and initializing the data structure comprises introducing and initializing the data structure which is a priority queue, including maintaining the entries in an ascending order according to the score; and the step (c) of extracting the entry with the lowest score comprises extracting the first entry from the priority queue.

3. A method as described in claim 2, further comprising the step of maintaining the priority queue in an ascending order according to the score, comprising sorting the priority queue, being performed after the step (f).

4. A method as described in claim 2, wherein the step (f) comprises inserting the expanded entries into the priority queue so that the priority queue maintains the ascending order according to the score.

5. A method as described in claim 2, wherein the step of determining the lightpath topology comprises:

identifying lightpaths in the network;

assigning lightpath identification numbers to the lightpaths;

identifying fiber spans over which the lightpaths are laid.

6. A method as described in claim 5, wherein the step of identifying lightpaths in the network comprises identifying all lightpaths in the network including protection lightpaths and reconfigurable lightpaths.

7. A method as described in claim 2, wherein the step (e) of calculating the score comprises calculating the score to be equal to the sum of:

the total value of the DCMs stored in the entry; and the remaining effective dispersion in the network divided by the number of lightpaths having remaining effective dispersion.

8. A method as described in claim 2, wherein the step (e) of calculating the score comprises calculating the score to be equal to the sum of:

$\Sigma w_i \cdot DCM_{min}$, wherein $DCM_{min}$ is the smallest DCM value to be used in the network, and $w_i$ is the weight factor for the corresponding $DCM_i$ stored in each expanded entry; and $$g(x) \cdot \min\left(\frac{w_i \cdot DCM_{min}}{DCM_i}\right),$$

wherein g(x) is the remaining effective dispersion in the network divided by the number of lightpaths having remaining effective dispersion, and $$\min\left(\frac{w_i \cdot DCM_{min}}{DCM_i}\right)$$

is the smallest value of $$\left(\frac{w_i \cdot DCM_{min}}{DCM_i}\right).$$

9. A method as described in claim 2, wherein the step (c) of determining if the effective dispersions are substantially zero comprises measuring the effective dispersions in units of distance.

10. A method as described in claim 2 further comprising the step of determining alternative DCM locations such that the transfer of the DCM to the alternative location does not change the accumulated dispersion along any lightpath in the network.

11. A method as claimed in claim 1, wherein the step of introducing and initializing the data structure comprises introducing and initializing the data structure, which is a series of priority queues, the series being maintained in an ascending order according to the score of the first entry of the priority queues, and the step (c) of extracting the entry with the lowest score comprises extracting the first entry from the first priority queue in the series of priority queues.

12. A method as described in claim 1, the method providing the optimal location and value of one or more dispersion compensating modules (DCMs) in an optical network, the optimal location being defined as providing one or more of the following:

optimal total dispersion in the network;

minimal number of DCMs in the network; and minimal cost of DCMs in the network.

13. A method as described in claim 1, wherein the step (d) of expanding comprises expanding the extracting entry into multiple entries by adding every available combination of DCM location and value to the extracted entry.

* * * * *